Oct. 2, 1956          F. R. ARAMS          2,765,404
MICROWAVE FILTER
Filed Dec. 14, 1951
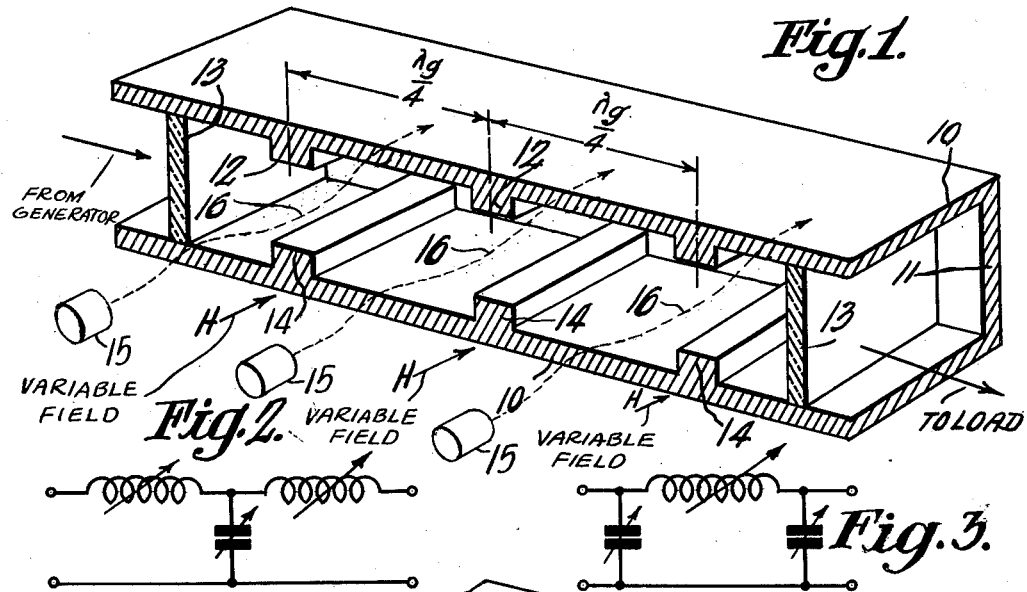
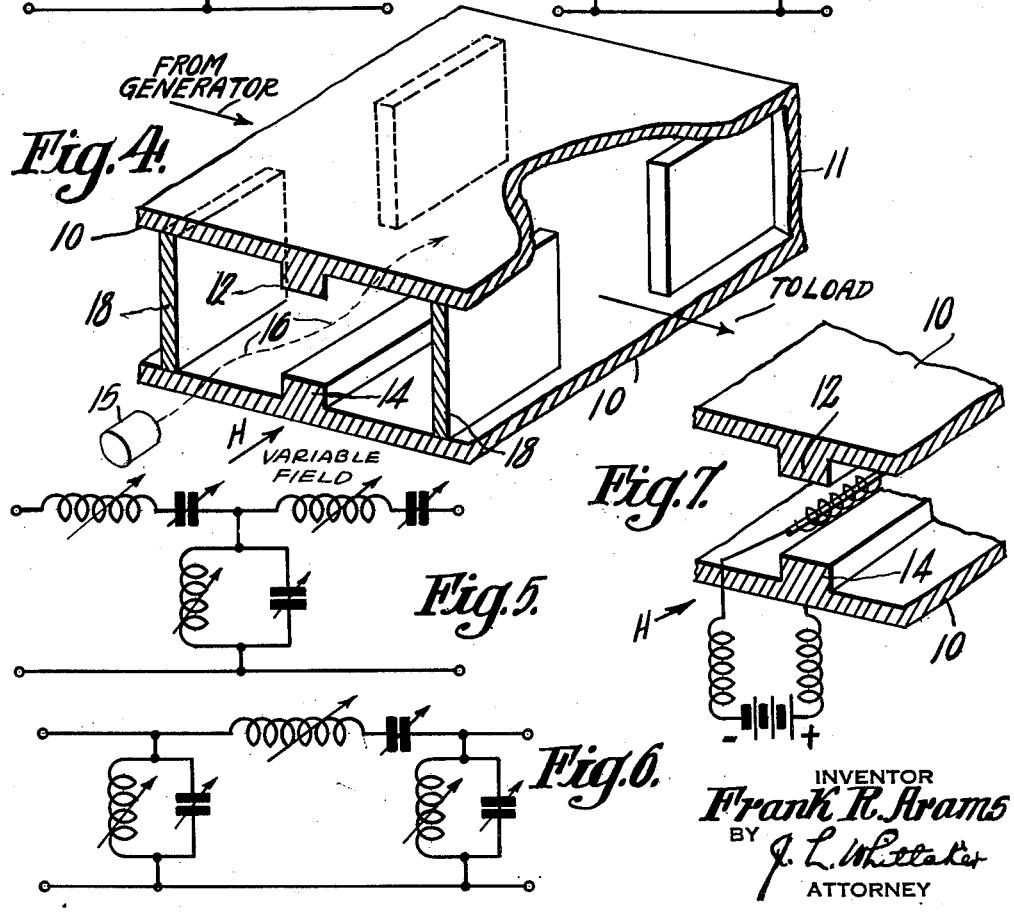
INVENTOR
Frank R. Arams
BY J. L. Whittaker
ATTORNEY

United States Patent Office 2,765,404
Patented Oct. 2, 1956

2,765,404

MICROWAVE FILTER

Frank R. Arams, East Orange, N. J., assignor, by mesne assignments, to the United States of America as represented by the Secretary of the Navy Application December 14, 1951, Serial No. 261,660

3 Claims. (Cl. 250—27)

This invention relates to electromagnetic wave filters and more particularly to such filters for use in waveguides at microwave frequencies.

It has been known that filtering in microwave guides may be accomplished by abruptly changing the impedance of the guide at definite positions along the guide, such as at quarter-wave length intervals. Examples of devices used for this purpose are abrupt changes in the dimensions of the guide and partitions in the guide forming irises. Another system of filtering used is a chain of tuned resonators coupled by quarter-wave sections. (Proceedings of Ire, November 1947, page 1318.)

In analyzing the reactions taking place in microwave filters, and in designing filters, recourse is had to lumped elements commonly used in the lower frequencies of electromagnetic transmissions, such as inductors and capacitors. For example, it is known that a pair of spaced iris plates constricting the waveguide in the direction parallel to the E vector in a hollow pipe rectangular waveguide transmitting in the $TE_{10}$ mode, may effect a capacitive reactance. If the plates are rotated 90 degrees, the reactance is inductive. Singly or by a suitable combination of these and similar elements, including resonant elements, a device is formed that may act as a filter, rejecting all but certain bands of frequencies.

In the prior art of microwave filters the range of filtering is limited to a definite band of frequencies due to their fixed constructions. Also the rapidity of variation of the elements is limited because the variation has to be done mechanically. The present invention avoids these limitations and other disadvantages by providing a filter for a microwave guide in which the cut-off and phase characteristics of the filter are variable or adjustable electrically over a desired range of frequency. Furthermore, this invention can be employed to vary the characteristics of different types of filters, such as low-pass, high-pass, band-pass, or band-elimination type filters, but its usefulness is enhanced in microwave filters in which elements consisting of small gaps, constricting the guide in the direction of the E vector, are employed.

Briefly, the present invention effects and imposes controlled variable reactances at suitable and predetermined positions along the microwave transmission system, such as a waveguide, which reactances may be analyzed as equivalent to lumped reactances in wire filter transmission systems. The reactances are varied by varying the interaction of electrons with the microwave radiation.

The principal object of the invention is to provide a novel method of and novel apparatus for filtering electromagnetic waves.

Another object is to provide a method of and apparatus for filtering electromagnetic waves, adjustable with greater facility over a range of frequencies than heretofore possible or practicable.

Another object is to provide a novel method of and novel apparatus for effecting and imposing variable reactances on electromagnetic microwave transmissions.

A further object is to provide electronic control of a waveguide filter which may be a complex type of filter.

Another object is to provide a waveguide filter to which may be imparted easily and with rapidity desired changes of characteristics.

Another object is to provide a filter for a microwave guide system subject to electronic as distinguished from mechanical control of the filter characteristics.

Other objects and advantages of the invention will be apparent from the following detailed description made with reference to the accompanying drawings in which:

Fig. 1 is a cross-section view in perspective of a portion of a waveguide filter in which pairs of ribs extend transversely across the waveguide and form a space within the guide through which a variable reactance is applied;

Fig. 2 is a lumped-element equivalent circuit diagram of a low-pass T-section microwave filter obtainable from the filter in Fig. 1;

Fig. 3 is a lumped-element equivalent circuit diagram of a low-pass pi-section microwave filter obtainable from the filter in Fig. 1;

Fig. 4 is a cross-section view in perspective of a portion of a waveguide filter in which portions of the guide are divided into resonant sections by iris partitions and in which sections are positioned pairs of ribs transverse to the guide, and forming a space therebetween through which a variable reactance is applied.

Fig. 5 is a lumped-element circuit diagram of a T-section band-pass filter substantially the equivalent of the filter in Fig. 4;

Fig. 6 is a lumped-element circuit diagram of a pi-section band-pass filter substantially the equivalent of the filter in Fig. 4; and Fig. 7 is a cross-sectional view in perspective of another embodiment of the invention employing a space charge around a filament in a waveguide instead of a spiral beam.

Similar reference characters are applied to similar elements throughout the drawings.

Referring to Fig. 1, 10, 10 are two opposite walls of a waveguide system connected as indicated by the legends on the drawing at one end to a microwave power source and at its other end to a load. The part of the waveguide containing the electron beam or beams is vacuum sealed as by dielectric plates 13, 13 which may be, for example, of low-loss glass or other suitable ceramic suitably sealed to the walls. Spaced at equal distances apart and along the inner surfaces of walls 10 are ribs 12 on one of walls 10 paired with ribs 14 on the other. The ribs 12, 14 extend transversely to the direction of propagation of the electromagnetic waves within the guide. The spacing between the pairs of ribs along the waveguide is one-quarter guide-wavelength ($\lambda_g/4$) near the cut-off frequency of the desired filter.

Positioned opposite one of the ends of the spaces between pairs of ribs 12, 14 are conventional grid-controlled electron beam guns, not shown. These guns may be of the type disclosed in the pending Cuccia application, Serial No. 754,756, filed June 14, 1947, now Patent No. 2,542,797, dated February 20, 1951 entitled, "Microwave Coupling System and Apparatus." The gun includes a variable source of electrons, a variable electromagnet generating a unidirectional field (H) and a plurality of accelerating electrodes, each with its voltage supply and individual control. At the opposite ends of the spaces between pairs of ribs 12, 14 may be collector electrodes, not shown, conventionally connected to the acceleration electrodes. However, one side wall 11 may serve as collector electrode and function for all the beams. There are thus provided in the space between each of the pairs of ribs 12, 14 an electron beam of variable intensity and variable velocity which is projected, coaxially, in a controlled unidirectional magnetic field.

In operation, when the electrons in each electron beam enter the space between pairs of ribs 12, 14, they respond to the fields propagated within the guide by acquiring a component of motion transverse to the magnetic field, and assume a spiral path, the beam being indicated by arrows 16. It is understood that the path of the beam is not as shown by the arrow, which is merely a convenient highly schematic representation. The spiral beam's shape may be one which expands and then contracts, as known. The form of the spiral, whether small or large in radial dimensions, will depend upon the strengths of the magnetic fields, the rf electric field intensity across ribs 12, 14 and possibly the velocity of the electrons. The net energy, if any, absorbed by the electron beam will depend upon the radius of the helix described by the rotating electrons in the beam at their terminal exit from the waveguide (or on striking a collector in the guide), the angular velocity $\omega$ of the electrons, and the number of electrons in the electron beam. The angular velocity is determined by the relation $$\omega = \frac{|e|}{m}\mu_0 H$$

where H is the applied magnetic field, $e$ is the charge on an electron, and $m$ is the mass of an electron. The net energy absorbed may be made zero by proper adjustment of electron velocity and magnetic field. It is apparent that with the individual controls of the currents in the beam and its coaxial unidirectional magnetic field, the proportional amount of energy in the microwave radiation within the guide that is absorbed by the beam may be varied and determined over a wide range. So also may the pure reactance be varied, which pure reactance depends upon the amount of energy temporarily stored in the beam. Ordinarily, when the result of the beam interaction is purely reactive, the electron path (or beam path) will have the same diameter at exit of the beam from interaction with the microwave field as it did on entering or initiating reaction therewith. More generally, if the energy of the beam on exit, averaged over a cycle, is the same as that on entry averaged over a cycle, it is clear that the microwave radiation has neither contributed to nor received energy from the electron beam. Hence the beam has the effect of a pure reactance. The effect of these variations may be expressed in terms of impedance, and the impedance at the spaces between pairs of ribs 12 may be said to be varied electronically.

Another method of controlling the variable impedance by electrons involves creating a space charge between ribs 12, 14 which can be used to vary the effective impedance in the space occupied by the beam. One method of creating this space charge employs a tungsten cathode between ribs 12, 14 as is shown in Fig. 7. This arrangement of Fig. 7 may be substituted for each spiral beam unit of Fig. 1 or of Fig. 4. The effective impedance of the unit of Fig. 7 may be varied by the selection of the strength of the magnetic field and control voltages.

It is also apparent that the pairs of ribs 12, 14 act as a capacitative reactance. Special use is made of the impedance-transforming property of a quarter-wavelength transmission line, so that one quarter-wavelength down the guide the shunt arm capacitance will look like a series arm inductance. A quarter-wavelength further it will look like a shunt capacitance again. In this manner, by transforming all filter elements to a common reference plane in the guide, the equivalent lumped constant filter structure is obtained. The effective reactance of the ribs and that imposed by the spiral electron beam combine to determine the distributed characteristics of the individual sections of the waveguide. These characteristics may be as illustrated by the lumped elements in the circuit diagrams in Figs. 2 and 3. The values of the lumped elements are controlled and determined by adjusting the values of the various control voltages. Resistance components too may be present, but these are not illustrated.

It is not entirely necessary that pairs of ribs 12 be positioned on the inner surfaces of the walls 10 as long as the electron guns and coaxial magnetic fields are spaced approximately one quarter-wave apart along the waveguide. As stated hereinbefore, the ribs contribute with the electron beam to the over-all effective impedance at the selected positions of the pairs of ribs 12, 14.

Band-pass filters may be constructed in a waveguide system by converting sections of the guide into resonant chambers as, for instance, by inserting iris partitions in the guide, such as 18, 18 in Fig. 4. These chambers may be separated along the guide at distances equal to quarter-guide wave lengths in the waveguide or multiples thereof at the mean of the desired operating radiation frequencies within the guide. For high-pass or low pass filters, the quarter-guide wavelengths should be taken at the cut-off frequency. The resonant chambers can also take forms other than the one described, as is well-known to those skilled in the art.

In the longitudinal center of these chambers are positioned the transverse ribs 12, 14 and through the space between the pairs of ribs 12, 14 is projected an electron beam and a unidirectional magnetic field, as disclosed in connection to Fig. 1. The combination of the waveguide section between partitions 18, coacting with the electron beam 16, performs the same function as the individual electron beam and associated magnetic field in Fig. 1. This combination of the waveguide resonant section and the electron beam with its associated magnetic field may, therefore, be considered and is defined as an impedance unit. These impedance units are inserted in the waveguide system at distances apart equal to one quarter-guide-wave length of the mean wavelength of the propagated radiation.

In operation, the creation of a controlled and variable impedance between the ribs 12, 14 on the top and bottom walls 10 of the guide is similar to that hereinbefore disclosed in the arrangements in Fig. 1.

The equivalent lumped element reactance effects are shown in Figs. 5 and 6. These lumped-element equivalent circuits are, respectively, typical T-section and pi-section (constant-K type) band-pass filter circuits. Again resistive components have been neglected. Electronically variable high-pass and band-elimination filters can also be constructed by locating the elements in branches of the main waveguide line. It will also be apparent to those skilled in the art that electronically variable filters using more elements, and not necessarily of the constant-K type, can be built up. The filter need not be of the type employing quarter-wave length coupling sections in order to be made electronically variable. In a filter employing several electronically variable elements it is not necessary that all electron beams are to be turned on and off simultaneously, as it may be advantageous to vary some elements (e. g. shunt arms in the equivalent circuit), in a manner different from other elements (e. g. series arms in the equivalent circuit). It is apparent that the variable filter units or elements may sometimes be incorporated to advantage in branch waveguides. Thus by selecting the proper waveguide circuitry one can build variable high-pass, low-pass, band-pass, on band-stop filters using the principles of the invention.

It will be apparent that variations in the impedances imposed upon the microwave radiation in the guide will cause variations of the characteristics of the radiation, such as attenuated frequencies and phase shifting. The variable impedance devices are, therefore, adapted to vary and control these and other wave phenomena and characteristics.

The present invention in its broadest sense is not to be considered as limited to an electron gun and its coaxial magnetic field as the only variable impedance device adapted to be applied to the microwave radiation in a guide. The invention may be applied by employing space-charge electron clouds with a magnetic field, as illustrated in Fig. 7, or without a magnetic field, as well as with gas discharge plasma with or without a magnetic field. Spiral electron beams are preferred at the present state of the art as affording a greater range of variability of impedances, without introducing a large resistive component. This range may be made still larger with spiral beams by admitting a small quantity of gas to the electron beam space. The application of Hans K. Jenny, Serial No. 203,810, filed January 2, 1951, entitled "Electron Modulating Device" indicates the enhanced effect to be achieved in a single tuning chamber by using a beam in a gas atmosphere.

What is claimed is:

1. In comibnation a waveguide system having a longitudinal axis adapted for transmission therein of microwaves over a desired range of frequencies, a plurality of pairs of ribs positioned on the inner surfaces of opposite walls of said waveguide and extending in a direction at right angles to said longitudinal axis, the said pairs of ribs being positioned apart along said system at distances equal approximately to one quarter waveguide wavelength of the mean wavelength of said desired range of frequencies, means for producing a plurality of electron beams each projected through the space between one and only one pair of said ribs in a direction parallel to said ribs, the said beams being variable in current intensity, and a plurality of variable undirectional magnetic fields coaxial with said beams.

2. A combination as claimed in claim 1 including a pair of iris partitions between adjacent pairs of said ribs, said iris partitions being parallel to said ribs and spaced from each other approximately one-quarter waveguide wavelength of the mean wavelength at said desired range of frequencies.

3. A combination as claimed in claim 1 including means for independently controlling the intensities of said electron beams and the strengths of said magnetic field.

References Cited in the file of this patent

UNITED STATES PATENTS

| | | |
|---|---|---|
| 2,403,302 | Richmond | July 2, 1946 |
| 2,412,892 | Krasik | Dec. 17, 1946 |
| 2,416,168 | Fiske | Feb. 18, 1947 |
| 2,501,545 | Sproull | Mar. 21, 1950 |
| 2,527,770 | Smith | Oct. 31, 1950 |
| 2,540,488 | Mumford | Feb. 6, 1951 |
| 2,541,375 | Mumford | Feb. 13, 1951 |
| 2,560,859 | Gutton et al. | July 17, 1951 |
| 2,585,563 | Lewis | Feb. 12, 1952 |